Patented Aug. 5, 1947

2,425,152

UNITED STATES PATENT OFFICE 2,425,152

PLASTIC REFRACTORY

Herbert H. Greger and John J. Reimer, Washington, D. C.; said Reimer assignor to The Briggs Filtration Company, Bethesda, Md., a corporation of Maryland No Drawing. Application May 2, 1946,
Serial No. 666,841

30 Claims. (Cl. 106—67)

This invention relates to high temperature plastic refractories and more particularly has reference to such plastic refractories capable of air setting at room temperatures and above to produce bodies having high strength.

This application is a continuation-in-part of our copending applications Serial Nos. 510,401 filed November 15, 1943, and 513,726 filed December 10, 1943.

A plastic refractory consists essentially of a refractory filler such as ceramic grog, a bond clay and some water to produce sufficient plasticity to permit molding by ramming, hammering, rolling or other similar methods. Upon drying, the ceramic filler is bonded by the clay in the mixture. At temperatures below actual vitrification of the mass, the clay bond is naturally rather weak and therefore the material has certain severe limitations which considerably reduce its usefulness.

In order to prevent the formation of a mass having low strength at temperatures below red heat, certain additional binders, such as organic and inorganic bonding substances, may be added to the plastic refractory to effect a cementing of the clay and grog into a somewhat solidified body. In some instances, sodium silicate has been added to achieve such a cementing action. It is well known, however, that alkali metal silicates are excellent fluxes and that they form with clay or other silicates relatively low fusing glasses when subjected to the action of heat. When such fluxing in the formation of low fusing glasses takes place, the load bearing properties of the refractory mass are severely reduced and in addition the refractory properties of the material are also reduced, the pyrometric cone equivalent being lowered.

An ideal plastic refractory is one which has high strength when dried in air and which maintains this strength until a ceramic body is developed above 900° C.(1652° F.). Most plastic refractories now on the market have low strength when dried at room temperature and maintain this low strength until fired above 900° C. When sodium silicate is used, it increases the strength at low temperatures but decreases the refractoriness of the body. When organic binders are used these increase the strength of the dry specimens but the strength drops at 300 to 400° C. (572° to 752° F.), which is undesirable. If a refractory mortar is desired, the material must also have good adhesion to the brick, sufficient plasticity for easy troweling, and a pyrometric cone equivalent similar to the brick.

Plastic refractories are mostly utilized in the formation of linings and for patching the walls of various types of kilns and furnaces. Such refractories therefore are exposed to the highest heat in the kiln and must possess good refractory properties. Obviously, the addition of any substances, such as sodium silicate, which would form a flux reducing the melting points of the composition would detrimentally affect the desirable properties of the composition and would, in effect, defeat the purpose for which it was used.

The principal object of the present invention is the production of a plastic refractory which avoids the disadvantages of the prior art.

Another object of this invention is to provide a plastic refractory capable of air setting at room temperatures and above to form a material having a high strength and which will maintain said high strength at temperatures up to those reached in firing.

A further object of this invention is to produce a plastic refractory including a refractory filler, a high temperature bonding material and an aluminum phosphate binder for imparting a high strength bond to the material upon air setting at low temperatures.

Still another object of this invention is to provide plastic refractories having desired plasticity, minimum shrinkage during drying and during firing and having high strength before and after firing and a high degree of serviceability.

Another object of this invention is to provide a refractory mortar capable of air setting at room temperatures and above to form a material having high strength and which will maintain said high strength and further improve it at temperatures reached by firing to red heat and above.

It is also an object of this invention to provide an air setting refractory mortar containing an aluminum phosphate binder having good properties for trowelling or making of dip joints, a minimum of shrinkage during drying and during firing, high strength before and after firing, and a high degree of serviceability.

With these and other objects in view, the present invention resides in the provision of a plastic refractory material comprising a filler such as ceramic grog and/or other refractory particles, a clay binder and an aluminum phosphate binder.

In accordance with the present invention, a plastic refractory or mortar is made by mixing together a composition comprising ceramic grog and/or other refractory material, a clay binder and an aluminum phosphate. Water is added to the mixture to produce a composition having the desired plasticity and then the substance is ready for use. After the material is applied or molded, it is air dried and due to the addition of the aluminum phosphate a high strength is imparted to the air dried or set material. This strength is maintained and gradually increased when the product is heated from 100° C. up to and above vitrification temperatures.

The plastic composition according to the present invention as before indicated comprises a refractory material such as ceramic grog and other refractory substances, a binder such as clay and an aluminum phosphate. It has been found that plastic refractories having the following compositions exhibit the desired properties in accordance with the present invention:

1. *Plastic refractory P23K*

|  | Parts |
|---|---|
| —4+20 mesh fire clay grog | 45.00 |
| —35+48 mesh calcined kyanite | 2.51 |
| —48+100 mesh calcined kyanite | 2.73 |
| —100 mesh calcined kyanite | 19.10 |
| Kentucky ball clay #4 | 7.61 |
| Georgia kaolin | 7.82 |
| Sesqui aluminum phosphate | 5.23 |
| Water | 10.00 |
|  | 100.00 |

2. *Plastic refractory P33K*

|  | Parts |
|---|---|
| —4+20 mesh fire clay grog | 45.0 |
| —35+48 mesh calcined kyanite | 2.8 |
| —48+100 mesh calcined kyanite | 3.0 |
| —100 mesh calcined kyanite | 20.0 |
| Kentucky ball clay #4 | 8.0 |
| Georgia kaolin | 8.2 |
| Sesqui aluminum phosphate | 3.0 |
| Water | 10.0 |
|  | 100.0 |

3. *Plastic refractory P35K*

|  | Parts |
|---|---|
| —4+20 mesh fire clay grog | 45.0 |
| —35+48 mesh calcined kyanite | 2.8 |
| —48+100 mesh calcined kyanite | 3.0 |
| —100 mesh calcined kyanite | 13.5 |
| Kentucky ball clay #4 | 14.0 |
| Georgia kaolin | 8.2 |
| Sesqui aluminum phosphate | 3.0 |
| Water | 10.5 |
|  | 100.0 |

4. *Plastic refractory composition (P. C. E. Cone 34)*

|  | Parts |
|---|---|
| —3+4 mesh grog (cone 35) | 12.0 |
| —4+20 mesh grog (cone 35) | 34.7 |
| —20+35 mesh grog (cone 35) | 9.0 |
| —35+48 calcined kyanite (cone 36) | 2.7 |
| —48+100 calcined kyanite (cone 36) | 4.5 |
| —100 calcined kyanite (cone 36) | 4.7 |
| Kentucky ball clay #4 (cone 32) | 8.3 |
| Taco clay (cone 35) (pure kaolin) | 12.5 |
| Mono-aluminum phosphate | 2.6 |
| Water | 10.0 |
|  | 101.0 |

Aluminum phosphates added to the compositions for effecting a bond upon air setting at low temperatures are hydrated aluminum phosphates of an essentially colloidal but water soluble type. The compositions near the sesqui-aluminum phosphate or between 1 and 1¾ mols of alumina and 6 mols of phosphoric acid may be considered the preferred range for purposes of this invention.

Depending on water content and composition or the ratio of alumina to phosphate radical, the properties of these phosphates undergo a considerable change. The mono-aluminum phosphate is a solid only in essentially water-free state, while the sesqui-aluminum phosphate may contain as much as 25 per cent, the dialuminum phosphate may contain as much as over 30 per cent water of hydration and still be a solid. More details as to the properties of these phosphates will be found in Patent No. 2,405,884 issued August 13, 1946, to Herbert H. Greger.

In suitable concentration, they form tacky viscous solutions of good adhesive quality, which increases somewhat from the mono- to the sesqui-aluminum phosphate. Plastics containing the sesqui-aluminum phosphate exhibit usually better strength, and workability, than those containing the mono-phosphate. The lower phosphates, including the mono- and the sesqui-phosphate, have been successfully used in plastics. They are somewhat hygroscopic with a decrease of the hygroscopic property from the mono- to the sesqui-aluminum phosphate. The compositions of higher aluminum content than the sesqui-phosphate have the tendency of giving off water from their solutions rather than absorbing it from the air. These can be produced in the form of a stable water soluble glass containing about 25 to 30 per cent of water of hydration.

This hydrated, solid type of aluminum phosphate can be used to advantage also in preparing a dry plastic refractory mixture. This type of phosphate is essentially inert to the atmosphere. It can be pulverized to a fine powder and disperses readily in water.

Such a plastic refractory is prepared essentially from volume stable refractory grog or other filler of low porosity. Depending on the use or the pyrometric cone equivalent value of the grog, its particle size, etc., the porosity of the filler particles themselves may vary between practically zero to 17 or 18 per cent. The preferred porosity, however, is low or not exceeding about 5 per cent.

In order to reduce shrinkage and limit the exposed grain surface of the filler, its particle size may be as coarse as minus 2½ or 3 mesh (to as fine as minus 20 mesh). These large particles reduce the need for a large quantity of bond and plasticizing water, and usually between 15 to 25 per cent of high grade refractory clay and about 2½ to 5 per cent and up to 10 per cent and even higher of aluminum phosphate on a dry basis is satisfactory for obtaining the desired strength. It has been found that even smaller percentages of aluminum phosphate will improve the green strength of the plastic refractory, the ranges mentioned giving the optimum results with economy of materials. Also higher concentrations of the aluminum phosphate give desirable results. The amount of water may vary but averages about 10 parts per 100 of the above dry mixture. Clays containing a fair percentage of montmerillonite, magnesia, lime and alkali metals should not be used as these will react and precipitate the phosphate. A pure kaolin is the most suitable clay in conjunction with aluminum phosphate solutions as it is stable and highly refractory. Where somewhat impure kaolins must be used they can be greatly improved for purposes of this invention by a mild acid wash, as for instance, dilute sulfuric acid.

The refractory properties of a plastic refractory and also of a refractory mortar are largely controlled by the type of filler, and the pyrometric cone equivalent value of the filter. For instance, a good kaolin has a pyrometric cone equivalent value of 34 or 35 which is true also of the grog prepared from it. Such materials as kyanite, mullite, diaspore, certain flint clays, Alundum, chromite, silicon carbide, andalusite, calcined topaz, have pyrometric cone equivalent values of 36 and above. Some of these materials may be used in either calcined or in raw form. At the inversion temperature between 1400 to 1550° C., i. e. during formation of mullite and glass from kyanite, andalusite, sillimanite, certain flint clays and also from topaz, an expansion in volume takes place which is relatively moderate in andalusite and may therefore make it possible of even using this material partly or wholly in raw uncalcined form as filler in a plastic refractory. This volume expansion can be utilized for counteracting shrinkage in the refractory and wholly eliminate it.

This shrinkage of a well compounded plastic is usually less than 2%. It may also be of interest to note that the plastic of Example 4 has a pyrometric cone equivalent value of cone 34 and a spalling loss of only 0.5% in standard spalling tests which permit a range up to 5%.

In the common non-air setting plastic, a condition of low resistance to the disintegration by water exists unless it is fired to a minimum temperature of 500° C. The air setting plastic containing aluminum phosphate becomes resistant to slaking in boiling water on drying at 100° C. This property of resistance to slaking is of considerable importance in many installations and uses of the composition.

The aluminum phosphates covering the whole range of compositions from the mono-aluminum phosphate to the di-aluminum phosphate are to a large extent interchangeable. They can be used interchangeably if an allowance is made for the increase in viscosity from the mono- to the di-aluminum phosphate for the identical water content. It should also be noted that hydrolysis on dilution with water begins at lower water contents as the alumina content in the binder increases. If for any reason the hydrolysis limits must be extended, such compounds as aluminum chloride, sulphate or nitrate may be added. Also ammonium chloride, sulphate or nitrate may be used for the purpose. If concentrations as high as 1 mol of aluminum chloride per mol of aluminum phosphate are used, then the range of composition may be extended even to the trialuminum phosphate.

In minor proportion, when added to a solid aluminum phosphate, these salts will increase the rate of dispersion of the solid powdered phosphate in water. For instance, the incorporation of aluminum sulphate in quantities of 10% (on dry basis) in the aluminum phosphate binder gave somewhat higher rates of solubility. It was also found of advantage in some cases to incorporate organic matter, such as phosphoric acid solutions of proteins, carbohydrates, polyethylene amines and related compounds. These solutions may be incorporated during or after the formation of the binder.

Either the plastic refractory or the refractory mortar may be produced in a wet plastic form or as a dry powder. The wet form has already been described. The dry powder does not differ fundamentally from the wet plastic except in its water content, otherwise the formula remains essentially the same and as shown for instance in Example 4. The water is added before use and mechanical or hand mixing continued for some time.

Of necessity, the mode of production of a dry plastic will differ somewhat from that of the wet material. The filler, clay and binder may be mixed together in a loose, dry form. This method gives perfectly satisfactory results in some instances but it was found that the binder in presence of the clay and the limited amount of water in the plastic will not wet and bond the coarse grog particles quickly and completely enough to form a well coherent mass. While this condition is not serious if a suitable mechanical mixer is available, some difficulty may be encountered when the composition is improperly mixed by hand.

The action of wetting is very considerably improved by coating the grog first with the aluminum phosphate binder. In addition to this advantage, it has been found possible to dry certain binder solutions on the grog and to incorporate it in this manner into the dry "plastic refractory."

This procedure is applied principally to binder compositions which are most readily prepared in the form of solutions, i. e. those ranging between the mono- and the sesqui-aluminum phosphate. This range may be extended to the di-aluminum phosphate by the addition of aluminum chloride, sulphate or nitrate.

The procedure is as follows: The binder is mixed in a mechanical mixer with the total grog in the desired proportion of mesh sizes and quantities. The mixture is then dried in a conventional drier at 200–300° F. The drying time for the thin film of binder on the grog is very short and the procedure eliminates the need of specialized equipment for drying the viscous and tacky binder, such as a flaking machine or spray drier. At the same time, the necessary coating of the grog is accomplished.

A further advantage in pre-coating the grog with the binder consists in closing the pores of the grog which will normally be filled with water. This amount of water for saturating the grog will, therefore, be available in the initial stages of mixing for producing a reduced viscosity and for aiding in the mixing. After the binder is dissolved from the pores, water will enter the grog.

It has been found that an improved product can be made by incorporating a wetting agent in the plastic refractory material. For instance, by adding about .25% of a wetting agent (such as a sodium alkyl naphthalene, sulphonate formulation), the green and vitrified strength of the product is improved.

Comparative tests have been made on the products of the present invention with available commercial refractories and the results were as follows:

*Modulus of rupture in pounds per square inch*

| Temp., °C. | Sample No.— | | | | | | | | | |
|---|---|---|---|---|---|---|---|---|---|---|
| | 1 | 2 | 3 | 4 | 5 | 6 | 7 | 8 | 9 | 10 |
| 110 | 121 | 421 | 360 | 660 | 330 | 59 | 235 | 58 | 44 | 480 |
| 200 | 122 | 430 | 368 | 611 | 345 | 48 | 100 | 59 | 53 | 362 |
| 300 | 114 | 444 | 380 | 553 | 363 | 52 | 77 | 56 | 69 | 264 |
| 400 | 123 | 560 | 420 | 550 | 384 | 47 | 68 | 50 | 75 | 257 |
| 500 | 128 | 569 | 462 | 591 | 395 | 61 | 117 | 62 | 97 | 238 |
| 600 | 168 | 527 | 431 | 617 | 417 | 71 | 68 | 61 | 113 | 217 |
| 700 | 219 | 574 | 455 | 698 | 445 | 70 | 80 | 70 | 169 | 201 |
| 800 | 326 | 597 | 504 | 763 | 501 | 92 | 124 | 90 | 347 | 182 |
| 900 | 544 | 662 | 525 | 773 | 527 | 135 | 160 | 216 | 435 | 213 |
| 1,000 | 744 | 710 | 596 | 803 | 567 | 198 | 228 | 408 | 517 | 251 |
| 1,100 | 796 | 726 | 617 | 823 | 624 | 237 | 244 | 586 | 548 | |
| 1,200 | 849 | 782 | 718 | 875 | 794 | 348 | 317 | 644 | 628 | |
| 1,300 | 1,390 | 1,136 | 980 | 1,288 | 879 | 350 | 463 | 689 | 393 | 915 |
| 1,500 | 1,742 | 1,874 | 1,665 | 1,544 | 1,516 | 1,636 | 1,338 | 880 | 531 | |

Sample No. 1 is the product of Example 1 without any aluminum phosphate.

Sample No. 2 is the product of Example 1.

Sample No. 3 is the product of Example 2.

Sample No. 4 is the product of Example 2, to which has been added .25% of the wetting agent.

Sample No. 5 is the product of Example 3.

Samples 6, 8, and 9 are commercial plastic refractory materials.

Sample 7 contains an organic bond.

Sample 10 is a cast refractory.

For purposes of the above comparison, bars 4½" x 2" x 2" were made in a metal mold by subjecting the specimens to a thousand pounds per square inch pressure in a hydraulic press. The test pieces were allowed to dry at room temperature for 24 hours and then transferred to an electric drying oven operated at 110° C. where they remained for 24 hours. After cooling to room temperature, one set of specimens was tested for dry or green strength on an Olsen testing machine to determine the modulus of rupture.

Sets of specimens were then fired to 200, 300, 400, 500, 600, 700, 800, 900, 1000, 1100, 1200, 1300, and 1500° C. Specimens were fired up to 1000° C. in an electric kiln and held at their respective temperatures for 5 hours. The others were fired in a gas fired kiln, and held at their respective temperatures for 5 hours.

In view of the foregoing results, it will be readily appreciated that the plastic refractories made in accordance with the present invention exhibit both high green and fired strengths. While some of the prior art materials have high fired strengths, they lack high green strengths. On the other hand, those compositions which have a fairly high green strength lack a high fired strength.

The plastic refractory is a ramming mixture and can be used not only for patching and as a lining, but also for preparing special shapes, kiln crowns, kiln doors, tunnel kiln car tops, and possibly whole kiln walls could be rammed or pressed. Small refractory articles such as crucibles, saggers, small furnaces, may be prepared by pressing and drying. After drying the strength of these articles or shapes is sufficient to stand handling or shipping. When installed and heated, a fire bond is developed wherever the temperature is high and where this is not the case the cold set of the refractory is sufficient to resist the usual wear on the kiln. Some further improvement in the dry strength and vitreous strength may be obtained if necessary by increasing the density of the wet refractory by vacuum mixing, pug milling or vacuum extrusion.

A kiln wall may be rammed against a wooden backing which is later removed. The ramming tools are so applied that their pressure or blows are not directed against the wooden backing, but almost vertically downward with a slight deviation towards the wood. In this manner one layer can be placed on top of the other. The plastic refractory will sustain a considerable amount of weight and the wall may be built up to a considerable height without collapsing. When the walls are completed a slow drying fire may be placed into the kiln and after the walls have hardened the crown may be placed on top. This may have been prepared either in sections by ramming into a suitable form or it may also be rammed in place. Various combinations of this ramming technique with the customary construction of brick are, of course, possible, and such combinations are in many cases the preferred method of construction. This is especially true of the combination of the rammed material with a structural insulating brick which then takes the outside or intermediate position in the furnace wall. On the outside an insulating coating may be applied.

It has been found that refractory mortars having the following compositions exhibit the desired properties in accordance with the present invention:

(1)

| | Parts |
|---|---|
| −35+48 mesh calcined kyanite (cone 35–36) | 6.5 |
| −48+100 mesh calcined kyanite | 26.0 |
| −100 mesh calcined kyanite | 19.4 |
| Kaolin (Taco clay) (cone 35) | 13.3 |
| Kentucky Ball clay No. 4 (cone 32) | 8.9 |
| Water | 18.5 |
| Mono-aluminum phosphate binder | 7.4 |
| | 100.0 |

P. C. E. value 34.

(2)

| | Parts |
|---|---|
| −35+48 mesh calcined kyanite (cone 35–36) | 6.5 |
| −48+100 mesh calcined kyanite | 26.0 |
| −100 mesh calcined kyanite | 19.4 |
| Kaolin (Taco clay) (cone 35) | 22.2 |
| Water | 18.5 |
| Sesqui-aluminum phosphate binder | 7.4 |
| | 100.0 |

P. C. E. value 34.

(3)

| | Parts |
|---|---|
| −35+48 mesh grog (cone 35) | 5.0 |
| −48+100 mesh grog (cone 35) | 5.4 |
| −100 mesh grog (cone 35) | 37.9 |
| Kaolin (Taco clay) (cone 35) | 15.5 |
| Kentucky ball clay No. 4 (cone 32) | 5.2 |
| Water | 20.7 |
| Aluminum phosphate (ratio 1¼Al$_2$O$_3$ to 3P$_2$O$_5$) from bauxite containing 18% SiO$_2$ and about 1% Fe$_2$O$_3$ | 10.3 |
| | 100.0 |

P. C. E. value 34.

Such a refractory mortar is prepared from essentially volume stable refractory grog or other suitable filler of low porosity. In order to reduce shrinkage the particle size of the filler is kept as large as possible; however it must be small enough to permit good workability in trowelling and in making dip joints the mortar slurry must not show rapid segregation. These conditions limit the grain size of the grog usually to smaller than 35 mesh. Besides the finer mesh sizes of grog, a high grade refractory clay or a mixture of such clays is incorporated in the mortar in amounts ranging between 15 to 40 per cent. To this mixture of clay and refractory filler is added 5 to 15 per cent or even more of aluminum phosphate on a dry basis for obtaining the desired air setting property and strength. It has been found that even smaller percentages of aluminum phosphate will improve the green strength of the refractory mortar, the ranges mentioned giving the optimum results with economy of materials. Also higher concentrations of the aluminum phosphates give desirable results. The amount of water may vary but averages about 25 parts per 100 of the dry mixture.

The dry mortar after plasticization with water to trowelling or dipping consistency as shown before in various examples, is useful for joining fire brick. The dry mortar may also be used as a ramming mixture if mixed with an amount of water considerably reduced and limited to approximately 10 to 15 per cent. It can be used in this form for patching or for the production of special shapes, small furnaces and crucibles by ramming and pressing. After drying the strength of these articles or shapes is sufficient to stand handling or shipping. When installed and heated, a fire bond is developed wherever the temperature is high and where this is not the case the cold set of the refractory mortar is sufficient to produce an effective bond.

We have found that the adhesion of the mortar to the brick when used for bonding bricks together is improved if a wetting agent is incorporated in the mortar. For this purpose, a wetting agent such as (a sodium alkyl naphthalene sulphonate formulation) is very suitable. A wetting agent may be incorporated in either the wet mortar or in a dry mortar mix. In the latter instance, the wetting agent should be added in solid form to the dry mixture. Such a wetting agent when incorporated in a dry mortar mix will dissolve when water is added to the mixture to produce a wet paste.

A number of tests have been made on mortars prepared in accordance with the present invention and it is believed that duplication of the results which we have obtained employing standard test methods can be accomplished by those skilled in the art. In evaluating test results the component picture should be considered rather than individual results especially in the case of air set strength of the mortars in comparison with the strength of fired mortars.

The pyrometric cone equivalent test indicated that air setting mortars having aluminum phosphate binders incorporated therein impart high refractory properties to the mortars. In the case of the air setting mortars having compositions as set forth in Examples 1, 2 and 3, it has been found that such compositions have a pyrometric cone equivalent equal to standard cone 34 (3200° F.). As indicated in the examples, the pyrometric cone equivalents of the components of the mixtures range between cone 32 and cone 36.

The results of a heat soak test at 2912° F. confirm the refractory properties indicated by the P. C. E. values. This test consists of laying a pier of three bricks with the mortar. The top and bottom bricks were 9-inch straight brick while the middle section consisted of two half-bricks. The pier of bricks was assembled in this manner in order to have both vertical and horizontal joints. After drying at room temperature for 24 hours and at 220° F. for a further 24 hours, the pier of bricks was then mounted in a kiln and subjected to a temperature of 2912° F. and held at that temperature for 5 hours. After the furnace was cooled, the pier of bricks was thoroughly examined and no evidence of melting or flowing of the joint material or any change in joint thickness could be found.

Another important test concerned the deformation at high temperatures. The mortars containing the aluminum phosphate binders are more resistant to deformation under load when subjected to elevated temperatures than are mortars containing the customary silicate of soda binders. It was found that the mortar joint suspending the weight of a 9-inch standard fire brick over a span of 15½ inches did not fail until a temperature of 1490° C. was reached in comparison to 1420° C. for a mortar containing a sodium silicate binder. The sodium silicate mortar apparently became soft at the failing temperature while the phosphate mortar was more refractory and failure occurred between brick and mortar rather than in the mortar itself. In places the brick surface was broken off and adhered to the mortar.

The mortars containing the phosphate binders show good bonding strengths when air dried as well as when fired to all temperatures before a fired ceramic bond is developed in the mortar. The advantage of the aluminum phosphate lies in the fact that good strengths are developed at lower temperatures and that the aluminum phosphate binder does not decrease the refractoriness of the mortar at high temperatures. The following table gives an illustration of the bonding strengths that are developed at various temperatures by the air setting refractory mortar containing sesqui-aluminum phosphate.

| Temperature | Modulus of Rupture, Lbs. per sq. in. |
| --- | --- |
| Airset | 605 |
| 110° C | 784 |
| Cone 12 | 1,148 |
| Cone 18 | 1,699 |

We have found that a very effective mortar of the dry type can be produced by drying the liquid binder on the grog or kyanite. Twenty per cent of the liquid binder was used, containing 50 per cent solid phosphate; it was mixed with the kyanite in the mesh sizes given in Example 3 in a mechanical mixer. The tacky mixture was fluffy and dried well in an oven at 250° F. within 1½ to 2 hours. Occasional stirring naturally promotes the drying.

In commercial practice, the mixture of kyanite and binder may be dried on a wire screen belt in a tunnel drier and since the material is quite fluffy warm air may be blown through it and thus the drying time could be considerably reduced.

After breaking the loose aggregate up to a particle size of through 20 mesh, it was mixed with the necessary amount of clay. This mixture is the dry binder ready for packaging. For use it is mixed with water. If a power mixer is available about 15 minutes of mixing time were found sufficient to dissolve the phosphate. The less effective hand mixing methods with a hoe take somewhat longer. If maximum strength is wanted, an aging period of 12 to 24 hours is recommended.

Air setting mortars containing solid silicate of soda require a considerably longer mixing time of from 2 to 5 hours, and develop maximum strength on aging for 12 to 24 hours.

A number of test bars were made from mortars of various compositions for purposes of comparing their moduli of rupture. The test bars were first dried for 18 hours at 70° C., then for 24 hours at 110° C. Some were then fired to 815° C. The results of these tests are given in the following table:

| Batch No. | No. of Binder | Firing Temp. °C. | Modulus of Rupture Lb./in.$^2$ |
|---|---|---|---|
| D1K | None | 110 | 200 |
| D1K | None | 815 | 434 |
| D2K | A1¼ | 110 | 1,368 |
| D2K | A1¼ | 815 | 1,704 |
| D3K | B1 | 110 | 2,198 |
| D3K | B1 | 815 | 1,988 |
| D4K | B1¼ | 110 | 1,334 |
| D4K | B1¼ | 815 | 1,742 |
| D5K | A1 | 110 | 1,243 |
| D5K | A1 | 815 | 1,668 |
| D6K | B1¼+glue | 110 | 1,804 |
| D6K | B1¼+glue | 815 | 1,773 |
| D7K | Dry A1¾ | 110 | 770 |
| D7K | Dry A1¾ | 815 | 1,034 |
| D8K | Dry A1⅝ | 110 | 875 |
| D8K | Dry A1⅝ | 815 | 1,058 |

Batch D1K is the control batch containing only the mixture of kaolin and ball clay as bond.

The other batches are similar to D1K except for the presence of about 10% of the binder in batches D2K, D3K, D4K, D5K, and D6K and about 6% of the binder in batches D7K, and D8K.

The code numbers for the binder may be expressed as follows:

| | $Al_2O_3$ Mols | $P_2O_5$ Mols |
|---|---|---|
| A1¼ | 1.25 | 3 |
| A1 | 1.00 | 3 |
| A1¾ | 1.75 | 3 |
| A1⅝ | 1.625 | 3 |
| B1 | 1.20 | 3 |
| B1¼ | 1.35 | 3 |

"A" binders are prepared from pure alumina and "B" binders are prepared from bauxite and contain some clay, and minor quantities of titania and iron oxide as impurities.

Bodies D7K and D8K contain solid powdered aluminum phosphate which was not dried on the kyanite but added as a loose powder.

Certain clays such as kaolinite and halloysite, but not montmerillonite (bentonite), have the ability of absorbing considerable quantities of the phosphate ($PO_4$) ion. Kaolinite will absorb about 37 g. and halloysite about 41 g. of phosphate ion per 100 g. of the dry clay. These figures are almost exactly equivalent to the amount of the hydroxyl ion in the clay. The exchange of the hydroxyl ion for the phosphate ion is particularly effective with aluminum phosphate solutions of low pH values, such as for instance at pH 0.5–2.5. The time involved for completion of the reaction may extend over several weeks and depends to some extent on the particle size of the clay. The phosphatization reaction produces an amorphous structure in the clay, which seems to be a contributing factor in the production of air setting mortar bodies of high strength. It also may explain in part why the strength of some mortar bodies is improved on ageing.

The absorption of the $PO_4$ ion by the clay has naturally an important relationship to the compounding of refractory mortars of the wet type. There the quantity of the phosphate ion must be sufficient to satisfy the clay, and some must be left over in the aluminum phosphate bond to keep this in a water soluble form. Usually mortars of the wet type contain a large enough quantity of aluminum phosphate to meet these conditions; however, it is necessary to choose a fairly acidic type of phosphate (between the mono- and the sesqui-aluminum phosphate), because in the removal of part of the phosphate radical by the clay the aluminum phosphate will attain a higher aluminum content and in this manner even become a solid. It is, therefore, necessary to guard against the formation of solid phosphate by adjusting both the quantity and the composition of the aluminum phosphate. In extreme cases where even the mono-aluminum phosphate does not produce the desired results, additional phosphate radical may be introduced by using aluminum phosphates of a more acidic nature than the mono-aluminum phosphate.

In mortars which are prepared in a dry form and where the interaction of aluminum phosphate with clay is eliminated due to the dry form of the phosphate, a very interesting advantage is obtained by the promotion of the air set through the clay. When water is added to the dry mortar, the clay will begin to take up some of the phosphate radical and a shift in the composition of the aluminum phosphate binder will occur and, in line with the above explanation, the alumina to phosphate ratio will increase. As the alumina content of these binders increase, they lose the hygroscopic properties and become hydrated solids, thus improving the rate and the quality of the air set.

From the foregoing, it will be appreciated that the present invention provides a mortar having good refractory properties and strength when air set and when fired.

In the usual commercial dry air setting mortars, a powdered silicate of soda is used as binder which on exposure to air during storage is destroyed by the carbon dioxide in the air. The aluminum phosphate is not chemically attacked by carbon dioxide and deterioration of the binder from this source will not take place.

While we have specifically described our invention with reference to specific compositions and uses of the composition, it should be understood that the invention is not to be restricted to the specific details thereof but should be limited only by the appended claims.

We claim:

1. An air setting plastic refractory having high green and fired strengths comprising about 15 to 25% of high grade refractory clay, a refractory filler, and about at least 2½ to 5% of water soluble colloidal aluminum phosphate ranging from mono- to di-aluminum phosphate.

2. An air setting plastic refractory having high green and fired strengths comprising pure kaolin, a refractory filler, and water soluble colloidal aluminum phosphate binder ranging from mono- to di-aluminum phosphate.

3. An air setting plastic refractory having high green and fired strengths comprising a refractory filler, a clay binder, and water soluble colloidal mono-aluminum phosphate.

4. An air setting plastic refractory having high green and fired strengths comprising a refractory filler, a clay binder, and water soluble colloidal sesqui-aluminum phosphate.

5. An air setting plastic refractory having high green and fired strengths comprising a refractory filler, a clay binder, and about at least 2½ to 5% water soluble colloidal sesqui-aluminum phosphate.

6. An air setting plastic refractory having high green and fired strengths comprising a refractory filler, a clay binder, and water soluble colloidal aluminum phosphate of a composition lying between those of mono- and di-aluminum phosphates.

7. An air setting plastic refractory having high green and fired strengths comprising fire clay grog, calcined kyanite, ball clay, kaolin, and water soluble colloidal aluminum phosphate ranging from mono- to di-aluminum phosphate.

8. An air setting plastic refractory having high green and fired strengths comprising fire clay grog, calcined kyanite, ball clay, kaolin, and at least about 2.5 to 5% water soluble colloidal aluminum phosphate ranging from mono- to di-aluminum phosphate.

9. An air setting plastic refractory having high green and fired strengths comprising a refractory clay, a refractory filler, water soluble colloidal aluminum phosphate ranging from mono- to di-aluminum phosphate, and a wetting agent.

10. An air setting plastic refractory having high green and fired strengths comprising fire clay grog, calcined kyanite, ball clay, kaolin, water soluble colloidal aluminum phosphate, ranging from mono- to di-aluminum phosphate, and a wetting agent.

11. A method of reducing the spalling loss in plastic refractories comprising incorporating water soluble colloidal aluminum phosphate ranging from mono- to di-aluminum phosphate in the composition thereof.

12. An air setting plastic refractory having high green and fired strengths and a spalling loss of about .5% comprising a refractory clay, a refractory filler, and water soluble colloidal aluminum phosphate ranging from mono- to di-aluminum phosphate.

13. An air setting refractory mortar having high air set and fired strengths comprising kaolin, a refractory filler or smaller than thirty-five mesh particle size, and a water soluble colloidal aluminum phosphate ranging from mono- to di-aluminum phosphate.

14. An air setting refractory mortar having high air set and fired strengths comprising a refractory filler of smaller than thirty-five mesh particle size, a clay binder, and water soluble colloidal mono-aluminum phosphate.

15. An air setting refractory mortar having high air set and fired strengths comprising a refractory filler of smaller than thirty-five mesh particle size, a clay binder, and water soluble colloidal sesqui-aluminum phosphate.

16. An air setting refractory mortar having high air set and fired strengths comprising a refractory filler of smaller than thirty-five mesh particle size, a clay binder, and water soluble colloidal aluminum phosphate of a composition lying between those of mono- and di-aluminum phosphates.

17. An air setting refractory mortar having high air set and fired strengths comprising fire clay grog of smaller than thirty-five mesh particle size, calcined kyanite, ball clay, kaolin, and water soluble colloidal aluminum phosphate lying between mono- and di-aluminum phosphate.

18. An air setting refractory mortar having high air set and fired strengths comprising a refractory clay, a refractory filler of smaller than thirty-five mesh particle size, a water soluble colloidal aluminum phosphate ranging between mono- and di-aluminum phosphate, and a wetting agent.

19. An air setting refractory mortar having high air set and fired strengths comprising fire clay grog of smaller than thirty-five mesh particle size, calcined kyanite, ball clay, a water soluble colloidal aluminum phosphate ranging between mono- and di-aluminum phosphate, and a wetting agent.

20. An air setting refractory mortar having high air set and fired strengths comprising a refractory clay, a refractory filler of smaller than thirty-five mesh particle size, and 5–15% of a water soluble colloidal aluminum phosphate ranging between mono- and di-aluminum phosphate.

21. An air setting refractory mortar having high air set and fired strengths comprising a refractory filler of smaller than thirty-five mesh particle size, a clay binder, and 5–15% of a water soluble colloidal sesqui-aluminum phosphate.

22. An air setting refractory mortar having high air set and fired strengths comprising fire clay grog of smaller than thirty-five mesh particle size, calcined kyanite of smaller than thirty-five mesh particle size, ball clay, kaolin, and 5–15% of a water soluble colloidal aluminum phosphate ranging between mono- and di-aluminum phosphate.

23. An air setting plastic refractory having high green and fired strengths comprising a refractory filler, a clay binder, and a water soluble colloidal aluminum phosphate of a composition ranging between those of mono- and di-aluminum phosphates having admixed therewith an aluminum salt of a strong inorganic acid.

24. An air setting plastic refractory having high green and fired strengths comprising a refractory filler, a clay binder, and a water soluble colloidal aluminum phosphate of a composition ranging between those of mono- and di-aluminum phosphates having admixed therewith an ammonium salt of a strong inorganic acid.

25. An air setting plastic refractory having high green and fired strengths comprising fire clay grog, calcined kyanite, ball clay, kaolin, and water soluble colloidal aluminum phosphate ranging from mono- to di-aluminum phosphate having admixed therewith an aluminum salt of a strong inorganic acid.

26. An air setting plastic refractory having high green and fired strengths comprising fire clay grog, calcined kyanite, ball clay, kaolin, and water soluble colloidal aluminum phosphate ranging from mono- to di-aluminum phosphate having admixed therewith an ammonium salt of a strong inorganic acid.

27. An air setting refractory mortar having high air set and fired strengths comprising a refractory filler of smaller than thirty-five mesh particle size, a clay binder, and water soluble colloidal aluminum phosphate of a composition lying between those of mono- and di-aluminum phosphates having admixed therewith an aluminum salt of a strong inorganic acid.

28. An air setting refractory mortar having high air set and fired strengths comprising a refractory filler of smaller than thirty-five mesh particle size, a clay binder, and water soluble colloidal aluminum phosphate of a composition lying between those of mono - and di-aluminum phosphates having admixed therewith an ammonium salt of a strong inorganic acid.

29. An air setting refractory mortar having high air set and fired strengths comprising fire clay grog of smaller than thirty-five mesh particle size, calcined kyanite, ball clay, kaolin, and a water soluble colloidal aluminum phosphate ranging between mono- and di-aluminum phosphate having admixed therewith an aluminum salt of a strong inorganic acid.

30. An air setting refractory mortar having high air set and fired strengths comprising fire clay grog of smaller than thirty-five mesh particle size, calcined kyanite, ball clay, kaolin, and a water soluble colloidal aluminum phosphate ranging between mono- and di-aluminum phosphate having admixed therewith an ammonium salt of a strong inorganic acid.

HERBERT H. GREGER.
JOHN J. REIMER.